United States Patent
Owen et al.

(10) Patent No.: US 7,293,286 B2
(45) Date of Patent: Nov. 6, 2007

(54) FEDERATED MANAGEMENT OF CONTENT REPOSITORIES

(75) Inventors: James Owen, Golden, CO (US); Gregory Smith, Westminster, CO (US); Rodney McCauley, Loveland, CO (US); Alexander Toussaint, Broomfield, CO (US); Joseph Conti, Boulder, CO (US); Jalpesh Patadia, Boulder, CO (US)

(73) Assignee: BEA Systems, Inc., San Jose, CA (US)

( * ) Notice: Subject to any disclaimer, the term of this patent is extended or adjusted under 35 U.S.C. 154(b) by 150 days.

(21) Appl. No.: 10/618,513

(22) Filed: Jul. 11, 2003

(65) Prior Publication Data

US 2004/0168084 A1 Aug. 26, 2004

Related U.S. Application Data (60) Provisional application No. 60/449,154, filed on Feb. 20, 2003, provisional application No. 60/451,174, filed on Feb. 28, 2003.

(51) Int. Cl.
*G06F 11/30* (2006.01)

(52) U.S. Cl. .............. 726/17; 726/18; 726/19; 726/21

(58) Field of Classification Search .......... 713/200; 726/17, 18, 19, 21
See application file for complete search history.

(56) References Cited

U.S. PATENT DOCUMENTS

| | | | |
|---|---|---|---|
| 5,369,702 A | 11/1994 | Shanton | 713/166 |
| 5,848,396 A | 12/1998 | Gerace | 705/10 |
| 6,029,182 A | 2/2000 | Nehab et al. | 715/523 |
| 6,058,392 A * | 5/2000 | Sampson et al. | 707/6 |
| 6,141,010 A | 10/2000 | Hoyle | 715/854 |
| 6,157,924 A | 12/2000 | Austin | 707/10 |
| 6,182,226 B1 | 1/2001 | Reid et al. | 713/201 |
| 6,226,745 B1 | 5/2001 | Wiederhold | 713/200 |
| 6,241,608 B1 | 6/2001 | Torango | 463/27 |
| 6,260,050 B1 | 7/2001 | Yost et al. | 715/501.1 |
| 6,269,393 B1 | 7/2001 | Yost et al. | 709/201 |
| 6,285,985 B1 | 9/2001 | Horstmann | 705/14 |
| 6,308,163 B1 | 10/2001 | Du et al. | 705/8 |
| 6,539,375 B2 | 3/2003 | Kawasaki | 707/5 |
| 6,571,247 B1 | 5/2003 | Danno et al. | 707/100 |
| 6,587,849 B1 | 7/2003 | Mason et al. | 707/5 |
| 6,754,672 B1 | 6/2004 | McLauchlin | 707/104.1 |

(Continued)

OTHER PUBLICATIONS

International Search Report Mailed Sep. 24, 2004 Int'l filing date: Feb. 19, 2004 PCT.

(Continued)

*Primary Examiner*—Nasser Moazzami
*Assistant Examiner*—Pramila Parthasarathy
(74) *Attorney, Agent, or Firm*—Fliesler Meyer LLP (57) ABSTRACT

A method for integrating a plurality of content repositories into a virtual content repository (VCR), comprising providing credential information to each one of said plurality of content repositories, receiving authorization information from each one of said plurality of content repositories, wherein the authorization information indicates whether or not an authorization procedure succeeded, integrating into the VCR each one of said plurality of content repositories whose authorization information indicates successful authorization, and wherein each one of said plurality of content repositories exposes a first set of services to enable its integration into the VCR.

46 Claims, 10 Drawing Sheets

U.S. PATENT DOCUMENTS

| | | | |
|---|---|---|---|
| 7,062,490 B2* | 6/2006 | Adya et al. | 707/10 |
| 2002/0069261 A1 | 6/2002 | Bellare et al. | |
| 2002/0107913 A1 | 8/2002 | Rivera et al. | |
| 2002/0111998 A1 | 8/2002 | Kim | |
| 2002/0124053 A1 | 9/2002 | Adams et al. | |
| 2002/0173971 A1 | 11/2002 | Stirpe et al. | |
| 2003/0065721 A1 | 4/2003 | Roskind | |
| 2003/0078972 A1 | 4/2003 | Tapissier et al. | |
| 2003/0131113 A1 | 7/2003 | Reeves et al. | |
| 2003/0187956 A1* | 10/2003 | Belt et al. | 709/219 |
| 2003/0229623 A1 | 12/2003 | Chang et al. | |
| 2004/0003071 A1 | 1/2004 | Mathew et al. | |
| 2004/0019650 A1 | 1/2004 | Auvenshine | |
| 2004/0024812 A1* | 2/2004 | Park et al. | 709/203 |
| 2004/0098470 A1* | 5/2004 | Kurihara | 709/219 |
| 2004/0125144 A1* | 7/2004 | Yoon | 345/769 |

OTHER PUBLICATIONS

Eiji Okamoto, "Proposal for Integrated Security Systems", Jun. 1992, IEEE Computer Society Press, p. 354-358.

http://java.sun.com/products/ejb/ (last visit: Dec. 7, 2004).

Sundsted, Todd, "JNDI Overview, Part 1: An Introduction to Naming Services", JavaWorld, Jan. 2000, pp. 1-6, (downloaded from: www.javaworld.com/javaworld/jw-01-2000/jw-01-howto_p.html).

Moore, Bill, et al., "Migrating WebLogic Applications to WebSphere Advanced Edition", IBM Redbooks, Jan. 2001, pp. 1, 3-4, 109-111 and 181-195.

Barrett, Alexandra, "Trying Out Transactions", SunExpert Magazine, Jan. 1999, pp. 57-59.

Ayers, Danny, et al., Professional Java Server Programming, Wrox Press, Ltd., Birmingham, UK, Dec. 1999, p. 515-545.

Ford, Nigel, Web Developer.com Guide to Building Intelligent Web Sites with JavaScript, Wiley Computer Publishing, New York, NY © 1998, pp. 65-86, 96-98, 101-102, 245-250 and 324-327.

Microsoft Computer Dictionary, 4$^{th}$ Edition, Microsoft Press, Redmond, WA, © 1999, p. 489.

http://www.javaworld.com/jw-12-2002/jw-1207-yesnoejb_p.html (last visit: Dec. 7, 2004).

Adya et al, "FARSITE: Federated, Available, and Reliable Storage for an Incompletely Trusted Environment," ACM SIGOPS Operating Systems Review, vol. 36, Issue SI (Winter 2002). OSDI '02: Proceedings of the 5th symposium on Operating systems design and Implementation. pp. 1-14.

* cited by examiner

FEDERATED MANAGEMENT OF CONTENT REPOSITORIES

CLAIM OF PRIORITY

This application claims priority from the following application, which are hereby incorporated by reference in their entirety:

SYSTEM AND METHOD FOR VIRTUAL CONTENT REPOSITORY, U.S. Provisional Patent Application No. 60/449,154, Inventors: James Owen, et al., filed on Feb, 20, 2003.

SYSTEMS AND METHODS FOR PORTAL AND WEB SERVER ADMINISTRATION, U.S. Provisional Patent Application No. 60/451,174, Inventors: Christopher Bales, et al., filed on Feb. 28, 2003.

CROSS-REFERENCE TO RELATED APPLICATIONS

This application is related to the following co-pending applications which are each hereby incorporated by reference in their entirety:

VIRTUAL REPOSITORY CONTENT MODEL, U.S. application Ser. No. 10/618,519, Inventors: James Owen, et al., filed on Jul. 11, 2003.

VIRTUAL REPOSITORY COMPLEX CONTENT MODEL. U.S. application Ser. No. 10/618,380, Inventors: James Owen, et al., filed on Jul. 11, 2003.

SYSTEM AND METHOD FOR A VIRTUAL CONTENT REPOSITORY, U.S. application Ser. No. 10/618,495, Inventors: James Owen, et al., filed on Jul. 11, 2003.

VIRTUAL CONTENT REPOSITORY APPLICATION PROGRAM INTERFACE, U.S. application Ser. No. 10/618,494, Inventors: James Owen, et al., filed on Jul. 11, 2003.

SYSTEM AND METHOD FOR SEARCHING A VIRTUAL REPOSITORY CONTENT, U.S. application Ser. No. 10/619,165, Inventor: Gregory Smith, filed on Jul. 11, 2003.

VIRTUAL CONTENT REPOSITORY BROWSER, U.S. application Ser. No. 10/618,379, Inventors: Jalpesh Patadia et al., filed on Jul. 11, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to content management, and in particular, a system and method for integrating disparate content repositories.

BACKGROUND

Content repositories manage and provide access to large data stores such as a newspaper archives, advertisements, inventories, image collections, etc. A content repository can be a key component of a Web application such as a Web portal, which must quickly serve up different types of content in response to a particular user's requests. However, difficulties can arise when trying to integrate more than one vendor's content repository. Each may have its own proprietary application program interface (API), conventions for manipulating content, and data formats. Performing a search across different repositories, for example, could require using completely different search mechanisms and converting each repository's search results into a common format. Furthermore, each time a repository is added to an application, the application software must be modified to accommodate these differences.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Parts of the description will be presented in data processing terms, such as data, selection, retrieval, generation, and so forth, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through electrical and/or optical components of a processor and its subsystems.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

Figure 1:
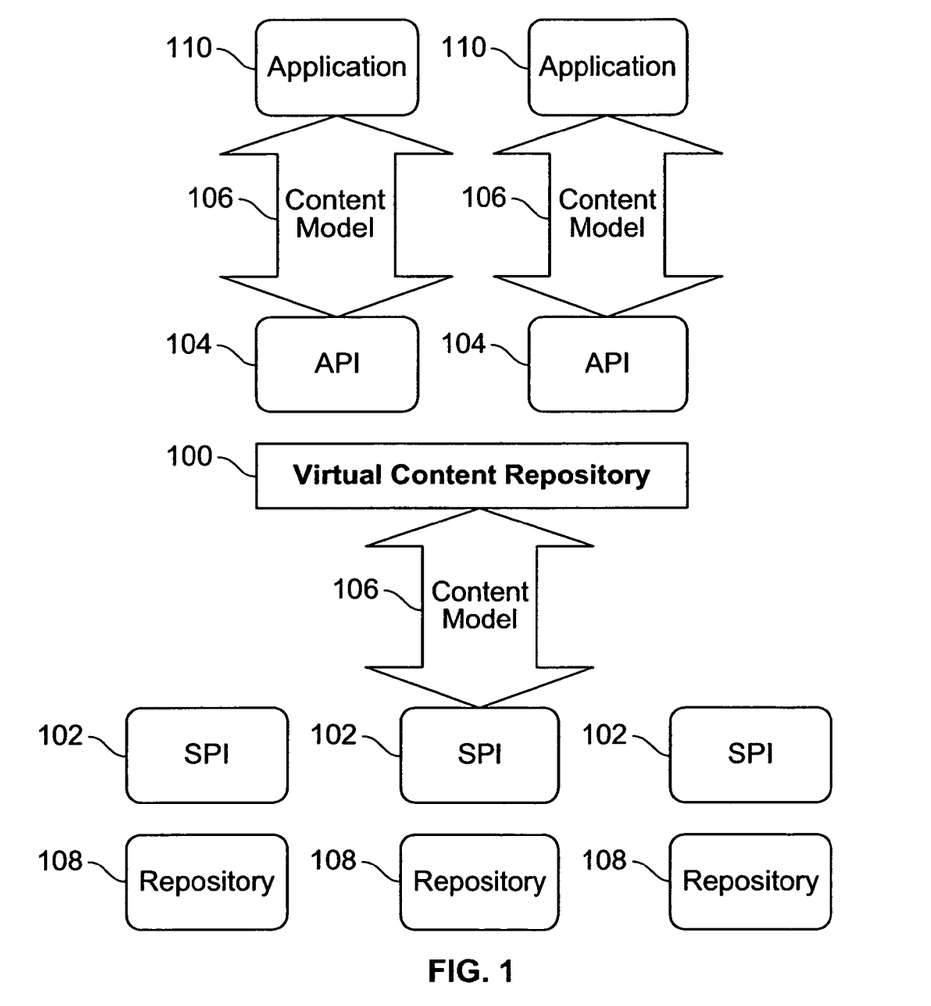
FIG. 1 is an illustration of a virtual content management framework in one embodiment of the invention.

FIG. 1 is an illustration of a virtual content management framework in one embodiment of the invention. A content repository 108 is a searchable data store. Such systems can relate structured content and unstructured content (e.g., digitally scanned paper documents, extensible Markup Language, Portable Document Format, Hypertext Markup Language, electronic mail, images, video and audio streams, raw binary data, etc.) into a searchable corpus. Content repositories can be coupled to or integrated with content management systems. Content management systems provide for content life cycle management (e.g. versioning), content review and approval, automatic content classification, event-driven content processing, process tracking and content delivery to other systems. For example, if a user fills out a loan application on a web portal, the web portal can forward the application to a content repository which, in turn, can contact a bank system, receive notification of loan approval, update the loan application in the repository and notify the user by rendering the approval information in a format appropriate for the web portal.

A virtual or federated content repository (hereinafter referred to as "VCR") 100 is a logical representation of one or more individual content repositories 108 such that they appear and behave as a single content repository from an application program's 110 standpoint. This is accomplished in part by use of an API (application program interface) 104 and an SPI (service provider interface) 102. An API describes how an application program, library or process can interface with some program logic or functionality. By way of a non-limiting illustration, a process can include a thread, a server, a servlet, a portlet, a distributed object, a web browser, or a lightweight process. An SPI describes how a service provider (e.g., a content repository) can be integrated into a system of some kind. SPI's are typically specified as a collection of classes/interfaces, data structures and functions that work together to provided a programmatic means through which a service can be accessed and utilized. By way of a non-limiting example, APIs and SPIs can be specified in an object-oriented programming language, such as Java™ (available from Sun Microsystems, Inc. of Mountain View, Calif.) and C# (available from Microsoft Corp. of Redmond, Wash.). The API and SPI can be exposed in a number of ways, including but not limited to static libraries, dynamic link libraries, distributed objects, servers, class/interface instances, etc.

In one embodiment, the API presents a unified view of all repositories to application programs and enables them to navigate, perform CRUD (create, read, update, and delete) operations, and search across multiple content repositories as though they were a single repository. Content repositories that implement the SPI can "plug into" the VCR. The SPI includes a set of interfaces and services that repositories can implement and extend including schema management, hierarchy operations and CRUD operations. The API and SPI share a content model 106 that represents the combined content of all repositories 108 as a hierarchical namespace of nodes (or hierarchy). Given a node N, nodes that are hierarchically inferior to N are referred to as children of N whereas nodes that are hierarchically superior to N are referred to as parents of N. The top-most level of the hierarchy is called the federated root. There is no limit to the depth of the hierarchy.

In one embodiment, content repositories can be children of the federated root. Each content repository can have child nodes. Nodes can represent hierarchy information or content. Hierarchy nodes serve as a container for other nodes in the hierarchy akin to a file subdirectory in a hierarchical file system. Content nodes can have properties. In one embodiment, a property associates a name with a value of some kind. By way of a non-limiting illustration, a value can be a text string, a number, an image, an audio/visual presentation, binary data, etc. Either type of node can have a schema associated with it. A schema describes the data type of one or more of a node's properties.

Figure 2:
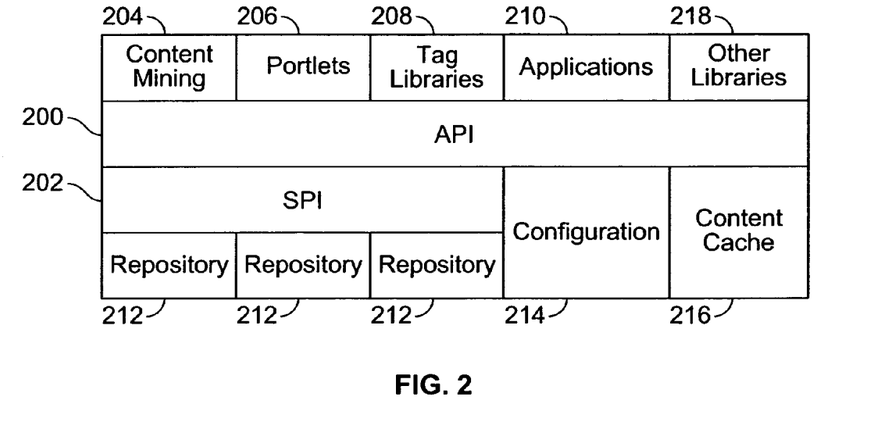
FIG. 2 is an illustration of functional layers in one embodiment of the invention.

FIG. 2 is an illustration of functional layers in one embodiment of the invention. API 200 is layered on top of SPI 202. The SPI layer isolates direct interaction with repositories 212 from the API. In one embodiment, this can be accomplished at run-time wherein the API library dynamically links to or loads the SPI library. In another embodiment, the SPI can be part of a server process such that the API and the SPI can communicate over a network. The SPI can communicate with the repositories using any number of means including, but not limited to, shared memory, remote procedure calls and/or via one or more intermediate server processes.

Referring again to FIG. 2 and by way of a non-limiting example, content mining facilities 204, portlets 206, tag libraries 208, applications 210, and other libraries 218 can all utilize the API to interact with a VCR. Content mining facilities can include services for automatically extracting content from the VCR based on parameters. Portlet and Java ServerPages™ tag libraries enable portals to interact with the VCR and surface its content on web pages. (Java ServerPages is available from Sun Microsystems, Inc.) In addition, application programs and other libraries can be built on top of the API.

In one embodiment, the API can include optimizations to improve the performance of interacting with the VCR. One or more content caches 216 can be used to buffer search results and recently accessed nodes. Content caches can include node caches and binary caches. A node cache can be used to provide fast access to recently accessed nodes. A binary cache can be used to provide fast access to the data associated with each node in a node cache. The API can also provide a configuration facility 214 to enable applications, tools and libraries to configure content caches and the VCR. In one embodiment, this facility can be implemented as a Java Management Extension (available from Sun Microsystems, Inc.). Exemplary configuration parameters are provided in Table 1.

TABLE 1

Exemplary Configuration Parameters
CONFIGURATION PARAMETERS

Active state for a binary cache of a repository (i.e., turn the cache on or off).
Maximum number of entries for a binary cache of a repository.
Time-to-live for entries in a binary cache of a repository.
Repository name.
Active state for a node cache of a repository (i.e., turn the cache on or off).

TABLE 1-continued

Exemplary Configuration Parameters
CONFIGURATION PARAMETERS

Max entries for a node cache of a repository.
Time-to-live for entries in a node cache of a repository.
Password and username for a repository.
Read-only attribute for the repository.
Class name of the repository implementation.
Additional key/value properties.

Figure 3:
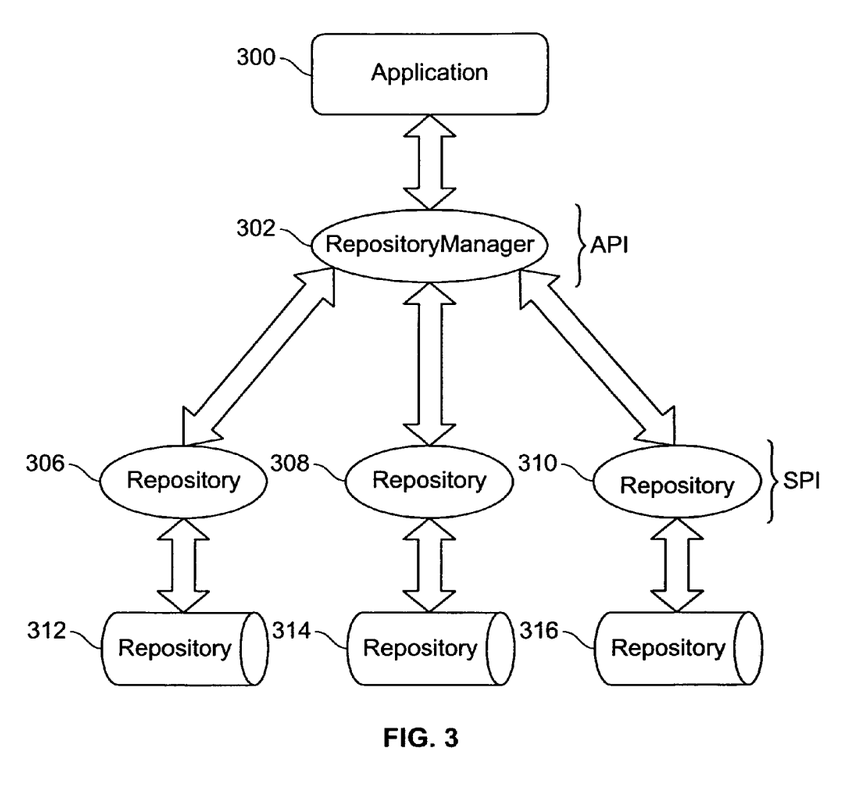
FIG. 3 is an illustration of objects used in connecting a repository to a virtual content repository in one embodiment of the invention.

FIG. 3 is an illustration of objects used in connecting a repository to a VCR in one embodiment of the invention. In one embodiment, objects implementing API interface RepositoryManager 302 can serve as a representation of a VCR from an application program's standpoint. A RepositoryManager connect ( ) method attempts to connect all available repositories with a current user's credentials to the VCR. By way of a non-limiting example, credentials in one embodiment can based on the Java™ Authentication and Authorization Service (available from Sun Microsystems, Inc.). Those of skill in the art will recognize that many authorization schemes are possible without departing from the scope and spirit of the present embodiment. Each available content repository is represented by an SPI Repository object 306–310. The RepositoryManager object invokes a connect ( ) method on a set of Repository objects. In one embodiment, a RepositorySession object (not shown) can be instantiated for each content repository to which a connection is attempted. In one embodiment, the RepositoryManager connect ( ) method can return an array of the RepositorySession to the application program, one for each repository for which a connection was attempted. Any error in the connection procedure can be described by the RepositorySession object's state. In another embodiment, the RepositoryManager connect ( ) method can connect to a specific repository using a current user's credentials and a given repository name. In one embodiment, the name of a repository can be a URI (uniform resource identifier).

Figure 4:
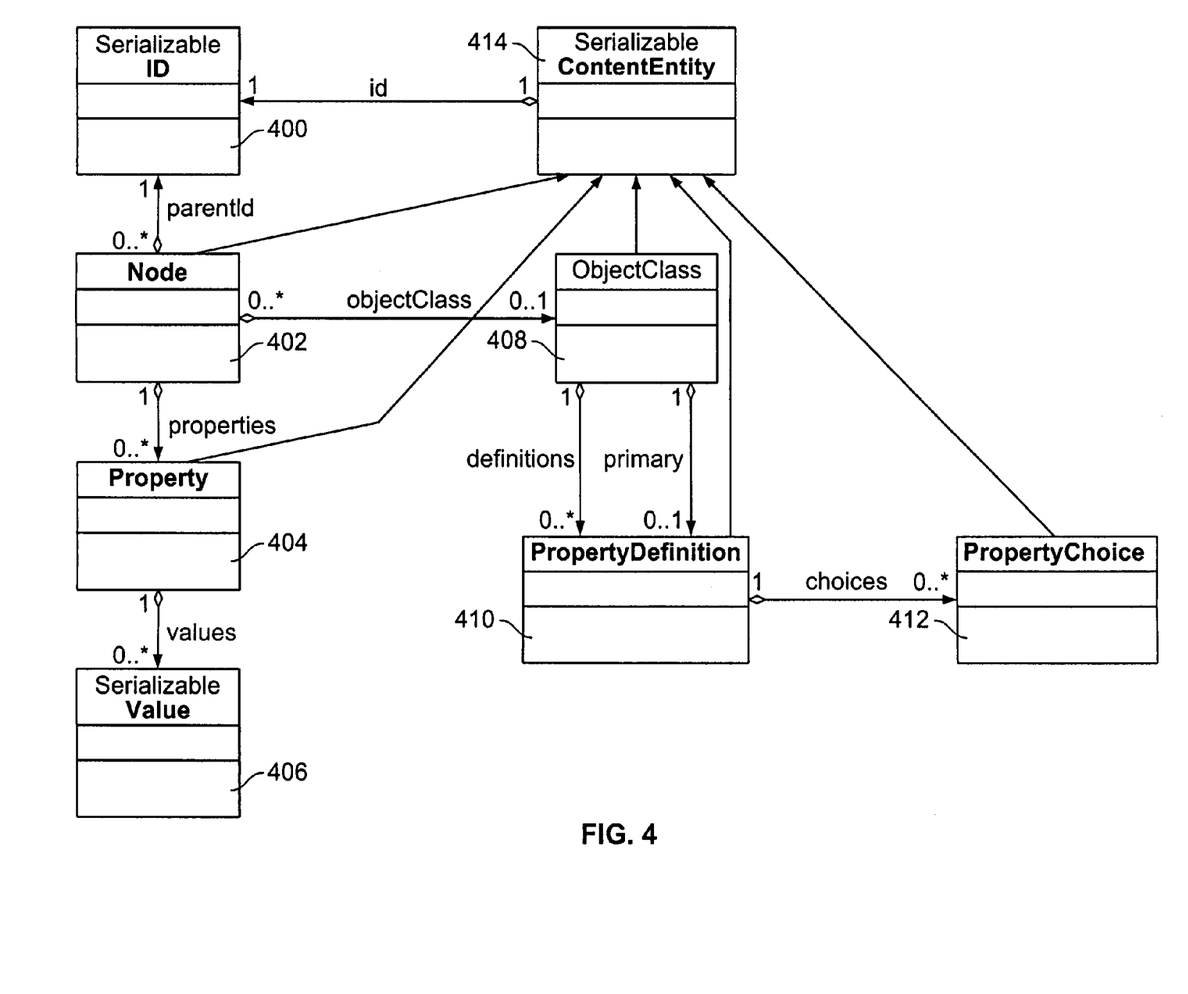
FIG. 4 is an exemplary content model in one embodiment of the invention.

FIG. 4 is an exemplary content model in one embodiment of the invention. The content model is shared between the API and the SPI. Each box in FIG. 2 represents a class or an interface. Hollow tipped arrows connecting boxes indicate inheritance relationships wherein the class/interface from which the arrows emanate inherit from the class/interface to which the arrows point. Solid tipped arrows indicate that the objects of the class/interface from which the arrows emanate can contain or have references (e.g., pointers or addresses) to objects of the class/interface to which the arrows point. In one embodiment, each object in a VCR has an identifier that uniquely identifies it. An identifier can be represented by an ID 400 (or id). An id can contain the name of a content repository and a unique id provided to it by the repository. In one embodiment, the id class/interface can be made available through a common super class/interface 414 that can provide services such as serialization, etc.

In one embodiment, content and hierarchy nodes can be represented by a Node 402 (or node). A node has a name, an id, and can also include a path that uniquely specifies the node's location in the VCR hierarchy. By way of a non-limiting example, the path can be in a Unix-like directory path format such as '/a/b/c' where '/' is a federated root, 'a' is a repository, 'b' is a node in the 'a' repository, and 'c' is the node's name. The Node class provides methods by which a node's parent and children can be obtained. This is useful for applications and tools that need to traverse the VCR hierarchy (e.g., browsers). Nodes can be associated with zero or more Property 404 objects (or properties). A property can have a name and zero or more values 406. In one embodiment, a property's name is unique relative to the node to which the property is associated. A Value 406 can represent any value, including but not limited to binary, Boolean, date/time, floating point, integer or string values. If a property has more than one value associated with it, it is referred to as "multi-valued".

A node's properties can be described by a schema. A schema can be referred to as "metadata" since it does not constitute the content (or "data") of the VCR per se. Schemas can be represented by an ObjectClass 408 object and zero or more PropertyDefinition 410 objects. An ObjectClass has a schema name that uniquely identifies it within a content repository. A node can refer to a schema using the ObjectClass name. In another embodiment, a content node can define its own schema by referencing an ObjectClass object directly. In one embodiment, there is one PropertyDefinition object for each of a node's associated Property objects. PropertyDefinition objects define the shape or type of properties. Schemas can be utilized by repositories and tools that operate on VCRs, such as hierarchical browsers. By way of a non-limiting example, a hierarchy node's schema could be used to provide information regarding its children or could be used to enforce a schema on them. By way of a further non-limiting example, a VCR browser could use a content node's schema in order to properly display the node's values.

In one embodiment, a PropertyDefinition can have a name and can describe a corresponding property's data type (e.g., binary, Boolean, string, double, calendar, long, reference to an external data source, etc.), whether it is required, whether it is read-only, whether it provides a default value, and whether it specifies a property choice type. A property choice can indicate if a property is a single unrestricted value, a single restricted value, a multiple unrestricted value, or a multiple restricted value. Properties that are single have only one value whereas properties that are multiple can have more than one value. If a property is restricted, its value(s) are chosen from a finite set of values. But if a property is unrestricted, any value(s) can be provided for it. PropertyChoice objects 412 can be associated with a PropertyDefinition object to define a set of value choices in the case where the PropertyDefinition is restricted. A choice can be designated as a default value, but only one choice can be a default for a given PropertyDefinition.

A PropertyDefinition object may also be designated as a primary property. By way of a non-limiting example, when a schema is associated with a node, the primary property of a node can be considered its default content. The isPrimary ( ) method of the PropertyDefinition class returns true if a PropertyDefinition object is the primary PropertyDefinition. By way of a further non-limiting example, if a node contained a binary property to hold an image, it could also contain a second binary property to represent a thumbnail view of the image. If the thumbnail view was the primary property, software applications such as browser could display it by default.

Figure 5:
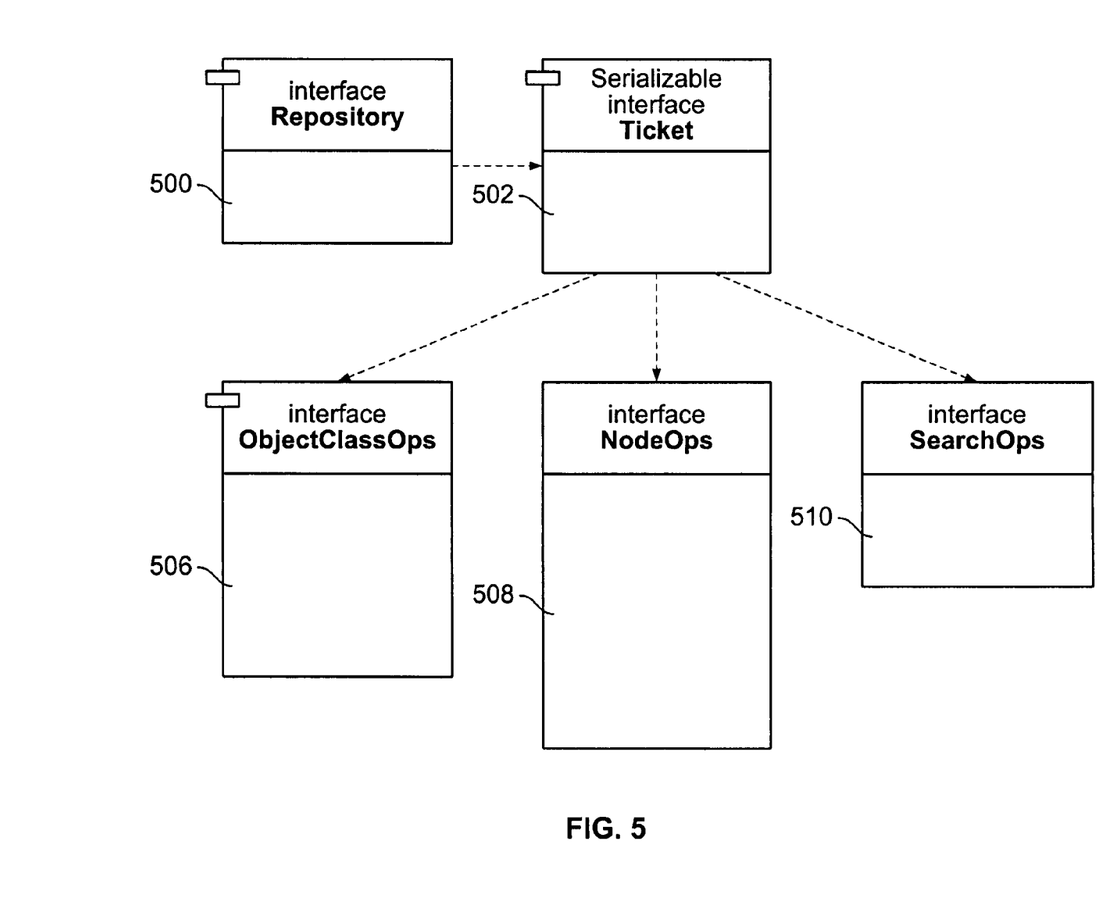
FIG. 5 is an exemplary service model in one embodiment of the invention.

FIG. 5 is an exemplary service model in one embodiment of the invention. Each box in FIG. 5 represents a class or an interface. A dashed arrow indicates that the interface from which the arrow emanates can produce at run-time objects implementing the classes to which the arrow points. A content repository's implementation of the SPI is responsible for mapping operations on the content model to the particulars of a given content repository. Repository interface 500 represents a content repository and facilitates connecting to it. The Repository has a connect ( ) method that returns an object of type Ticket 502 (or ticket) if a user is authenticated by the repository. In one embodiment, tickets are intended to be light-weight objects. As such, one or more may be created and possibly cached for each client/software application accessing a given repository.

A ticket can utilize a user's credentials to authorize a service. In one embodiment, a ticket can be the access point for the following service interfaces: NodeOps 508, ObjectClassOps 506, and SearchOps 510. An application program can obtain objects that are compatible with these interfaces through the API RepositoryManager class. The NodeOps interface provides CRUD methods for nodes in the VCR. Nodes can be operated on based on their id or through their path in the node hierarchy. Table 2 summarizes NodeOp class functionality exposed in the API.

TABLE 2

NodeOps Functionality
NodeOps FUNCTIONALITY

Update a given node's properties and property definitions.
Copy a given node to a new location in a given hierarchy along with all its descendants.
Create a new content node underneath a given parent.
Create a new hierarchy node underneath a given parent.
Perform a full cascade delete on a given node.
Retrieve all the nodes in a given node's path including itself.
Retrieve content node children for the given parent node.
Retrieve hierarchy node children for the given parent node.
Retrieve a node based on its ID.
Retrieve a node based on its path.
Retrieve the children nodes for the given hierarchy node.
Retrieve the parent nodes for the given hierarchy node.
Retrieve all the nodes with a given name.
Retrieve the Binary data for given node and property ids.
Moves a node to a new location in the hierarchy along with all its descendants.
Remove the ObjectClass from a given node.
Renames a given node and implicitly all of its descendants paths.
Get an iterator object which can be used to iterate over a hierarchy.

Figure 6:
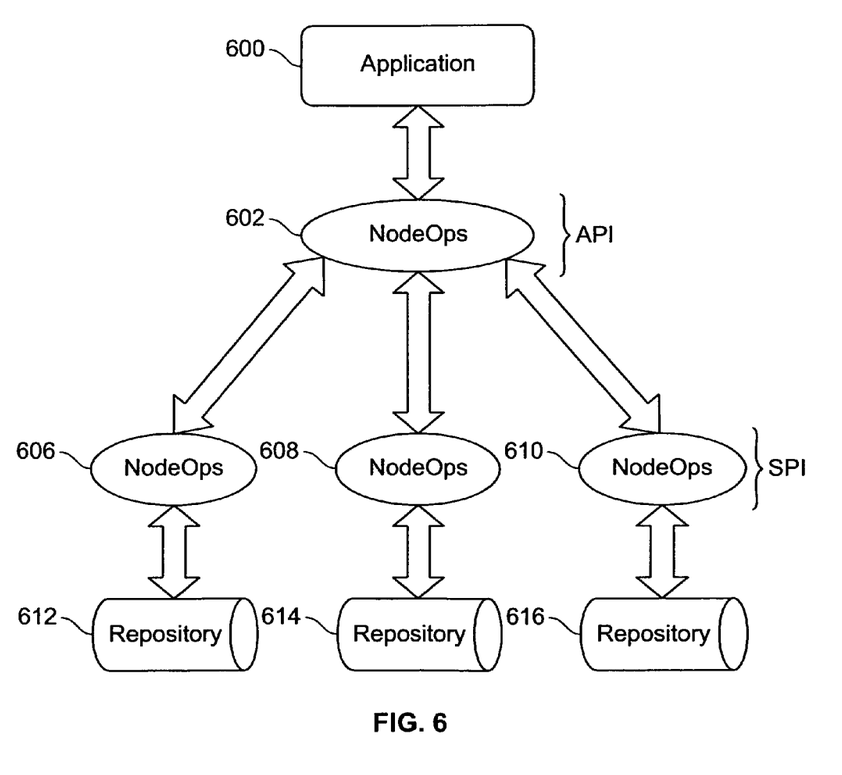
FIG. 6 is an illustration of NopeOps service interaction in one embodiment of the invention.

FIG. 6 is an illustration of NopeOps service interaction in one embodiment of the invention. Application 600 utilizes a NodeOps object 602 provided by the API which in turn utilizes one or more NodeOps objects 606–610 provided by an SPI Ticket. Each repository 612–616 is represented by a NodeOps object. When the API NodeOps 602 receives a request to perform an action, it maps the request to one or more SPI NodeOps objects 606–610 which in turn fulfill the request using their associated repositories. In this way, applications and libraries utilizing the API see a the VCR rather than individual content repositories.

As with the NodeOps service, there is one SPI ObjectClassOps object per repository and a single API ObjectClassOps object. The API ObjectClassOps object maps requests to one or more SPI ObjectClassOps which in turn fulfill the requests using their respective repositories. Through this service, ObjectClass and PropertyDefinition objects can be operated on based on their id or through their path in the node hierarchy. Table 3 summarizes ObjectClassOps class functionality exposed in the API.

TABLE 3

ObjectClassOps Functionality
ObjectClassOps FUNCTIONALITY

Create an ObjectClass, create PropertyDefinition(s) and associate them with the ObjectClass.
Add a given PropertyDefinition to an ObjectClass.
Delete an ObjectClass.
Delete a PropertyDefinition.
Retrieve an ObjectClass with a given id.
Retrieve all ObjectClass(es) available for all content repositories a given user is currently authenticated for.
Retrieve all of the ObjectClass(es) available for a given content repository.
Retreive a BinaryValue for the given PropertyChoice.
Retreive a PropertyDefinition.
Retrieve all PropertyDefinitions for the given ObjectClass.
Rename the given ObjectClass.
Updates the given PropertyDefinition.

As with the NodeOps and ObjectClassOps services, there is one SPI SearchOps object per repository and a single API SearchOps object. The API SearchOps object maps requests to one or more SPI SearchOps which in turn fulfill the requests using their respective repositories. Among other things, the SearchOps services allows applications and libraries to search for properties and/or values throughout the entire VCR. In one embodiment, searches can be conducted across all Property, Value, Binary Value, ObjectClass, PropertyChoice and PropertyDefinitions objects in the VCR. Search expressions can include but are not limited to one or more logical expressions, Boolean operators, nested expressions, object names, function calls, mathematical functions, mathematical operators, string operators, image operators, and Structured Query Language (SQL). Table 4 summarizes SearchOps class functionality exposed in the API.

TABLE 4

Exemplary SearchOps Functionality
SearchOps FUNCTIONALITY

Flushes all nodes inside a content cache.
Flushes a specified node from a content cache.
Performs a search with the given search expression.
Updates a content cache's attributes.
Updates a content cache's active state.
Updates a content cache's max entries.
Updates a content cache's time-to-live attribute.

Figure 7:
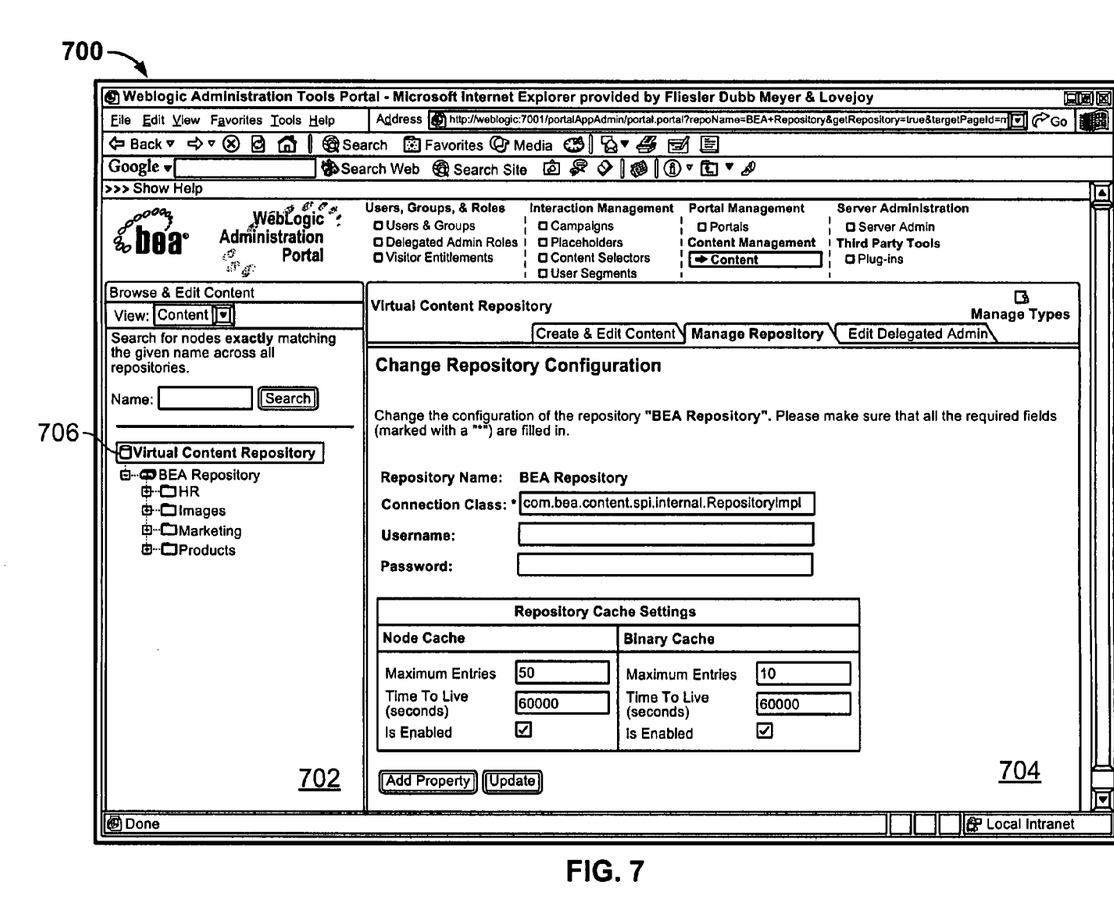
FIG. 7 is an illustration of a virtual content repository browser in one embodiment of the invention.

FIG. 7 is an illustration of a VCR browser in one embodiment of the invention. A VCR browser 700 can include one or more tools built atop the API and has a graphical user interface (GUI). In one embodiment, the browser can be rendered using Microsoft Windows® (available from Microsoft, Corp.). In yet another embodiment, the browser can be implemented as a web portal. Browser window 700 includes a navigation pane 702 and a context-sensitive editor window 704. The navigation pane displays a hierarchical representation of a VCR having one content repository ("BEA Repository") which itself has four hierarchy nodes ("HR", "Images", "Marketing", and "Products"). Selection of a hierarchy node can cause its children to be rendered beneath it in the navigation pane and cause an appropriate editor to be displayed in the editor window. Selection may be accomplished by any means, including but not limited to mouse or keyboard input, voice commands, physical gestures, etc. In this case, the VCR 706 is selected and a repository configuration editor is displayed in the editor window. The editor allows a user to change the configuration parameters (see Table 1) of the VCR. In one embodiment, configuration parameters are manipulated via Java Management Extensions (see FIG. 1).

Figure 8:
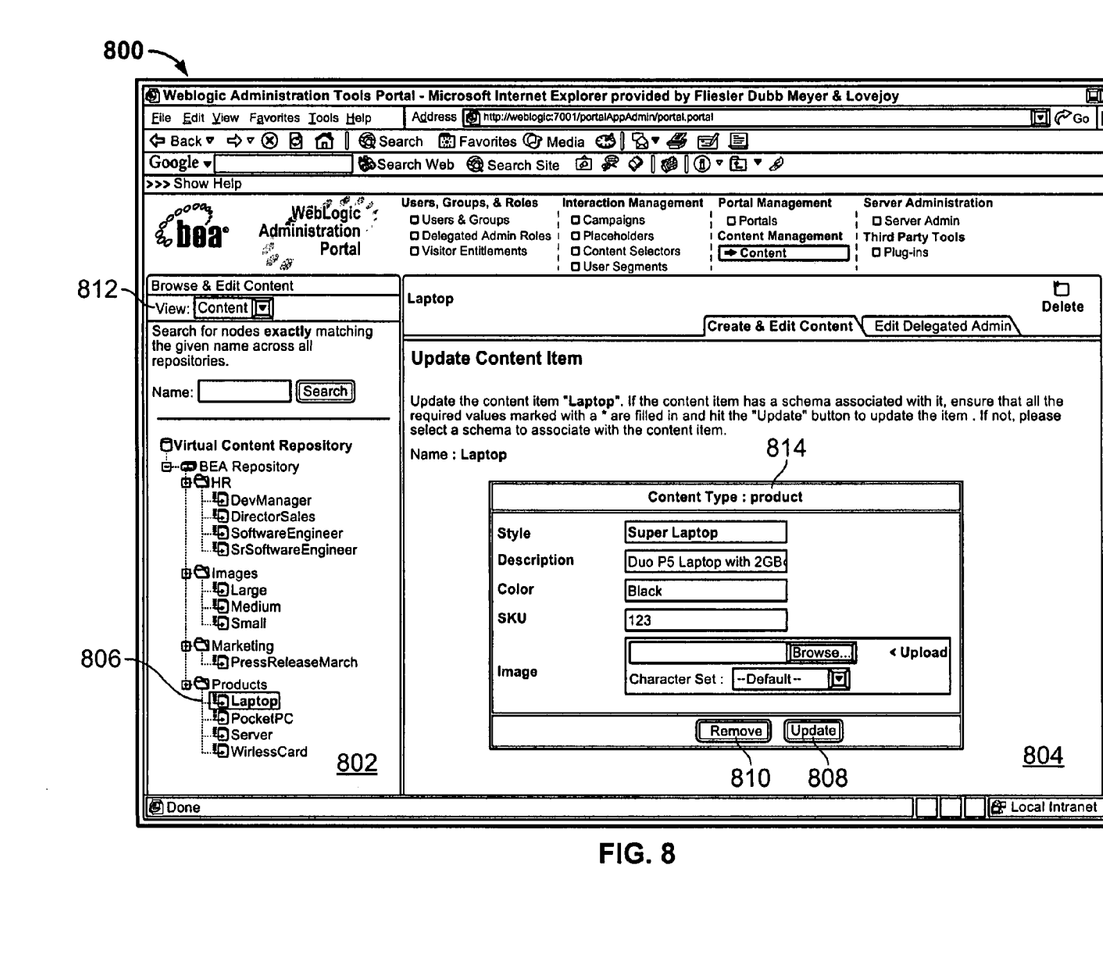
FIG. 8 is an illustration of a content editor in one embodiment of the invention.

FIG. 8 is an illustration of a content editor in one embodiment of the invention. Navigation pane 802 is in "content" mode 812 such that it selectively filters out nodes that define only schemas. Content node 806 ("Laptop") has been selected. Node 806 is a child of hierarchy node "Products", which itself is a child of repository "BEA Repository". Selection of node 806 causes a corresponding content node editor to be rendered in editor window 804. The editor displays the current values for the selected node. The content type 814 indicates that the schema for this node is named "product". In this example, the node has five properties: "Style", "Description", "Color", "SKU" and "Image". A user is allowed to change the value associated with these properties and update the VCR (via the update button 808), or remove the node from the VCR (via the remove button 810).

Figure 9:
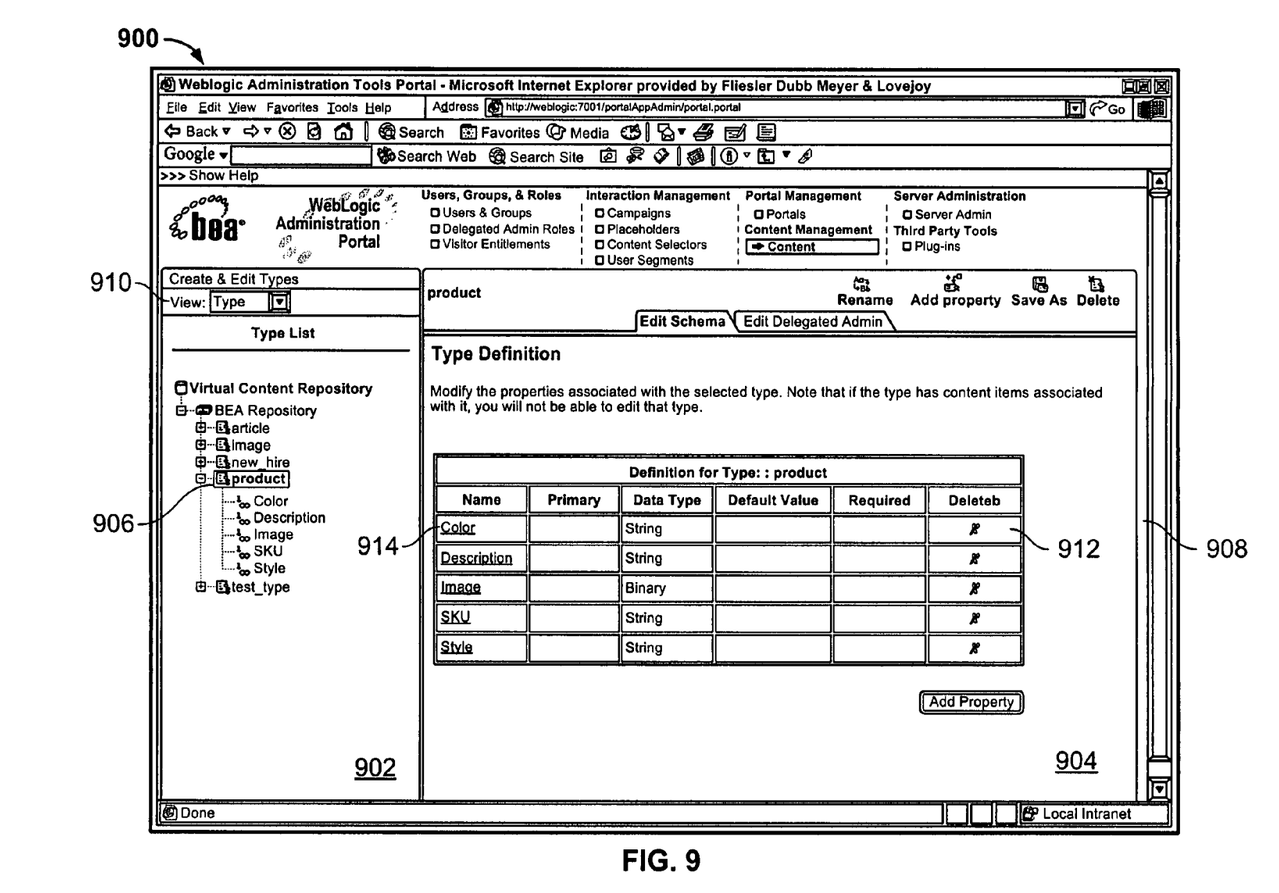
FIG. 9 is an illustration of a schema editor in one embodiment of the invention.

FIG. 9 is an illustration of a schema editor in one embodiment of the invention. Navigation pane 902 is in "type" mode 910 such that it only displays nodes that have schemas but no content. Schema node 906 ("product") has been selected. Node 906 is a child of repository "BEA Repository". Selection of node 906 causes a corresponding schema editor to be rendered in editor window 904. The editor displays the current schema for the selected node (e.g., derived from ObjectClass, PropertyDefinition, PropertyChoice objects). In this example, the node has five property definitions: "Style", "Description", "Color", "SKU" and "Image". For each property, the editor displays an indication of whether it is the primary property, its data type, its default value, and whether it is required. A property can be removed from a schema by selecting the property's delete button 912. A property can be added by selecting the "add property" button 908. A property's attributes can be changed by selecting its name 914 in the editor window or the navigation pane 906 (see FIG. 10).

Figure 10:
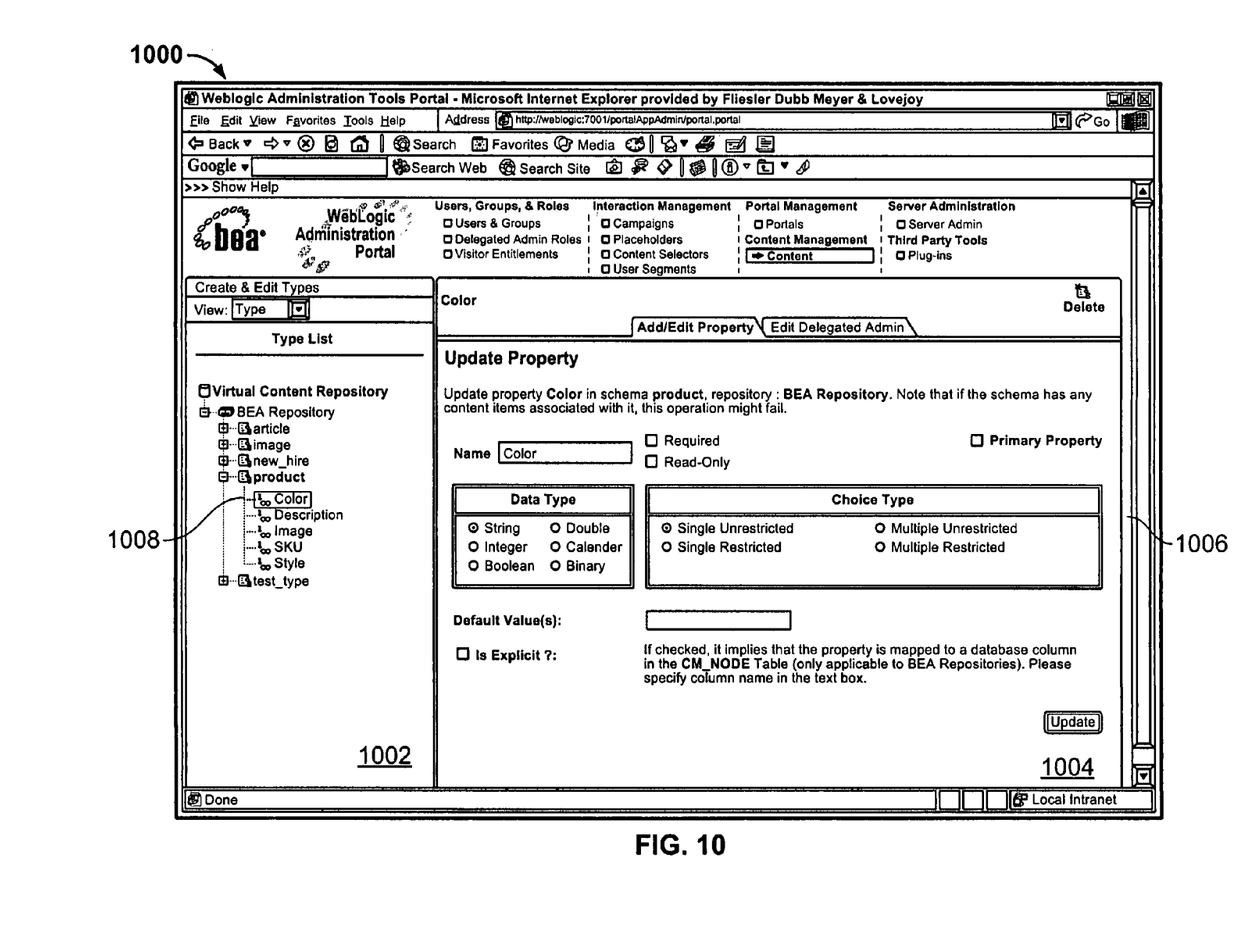
FIG. 10 is an illustration of a property editor in one embodiment of the invention.

FIG. 10 is an illustration of a property editor in one embodiment of the invention. The schema named "product" is being edited. Schema properties definitions are listed beneath their schema name in the navigation pane 1002. Schema property 1008 ("color") has been selected. The editor window 1004 displays the property's current attributes. The name of the attribute (e.g., "color"), whether the attribute is required or not, whether it is read-only, whether it is the primary property, its data type, default value(s), and whether the property is single/multiple restricted/unrestricted can be modified. Changes to the a property's attributes can be saved by selecting the update button 1006.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for integrating a plurality of content repositories into a virtual content repository (VCR), comprising:
providing credential information to each one of said plurality of content repositories;
receiving authorization information from each one of said plurality of content repositories, wherein the authorization information indicates whether or not an authorization procedure succeeded;
integrating into the VCR each one of said plurality of content repositories whose authorization information indicates successful authorization;
wherein each one of said plurality of content repositories exposes a first set of services to enable its integration into the VCR; and
wherein the VCR is a logical representation of the plurality of content repositories such that the plurality of content repositories behave as a single content repository.

2. The method of claim 1 wherein:
the credential information includes a username and a password.

3. The method of claim 1 wherein:
the credential information is based on Java Authentication and Authorization Service (JAAS).

4. The method of claim 1 wherein:
the first set of services accepts the credential information.

5. The method of claim 1 wherein:
the first set of services provides the authorization information.

6. The method of claim 1 wherein:
each one of said plurality of content repositories exposes a second set of services that is related to implementing a model of information in the content repository; and
wherein the model is compatible with a VCR content model.

7. The method of claim 1, further comprising:
providing a VCR content model; and
wherein each one of said plurality of content repositories exposes a second set of services related to extending the VCR content model to include information in the content repository.

8. The method of claim 1, wherein integrating into the VCR each one of said plurality of content repositories includes:
providing a hierarchical namespace spanning said plurality of content repositories.

9. The method of claim 1, wherein integrating into the VCR each one of said plurality of content repositories includes:
providing a content model related to representing content in each one of said plurality of content repositories.

10. The method of claim 1, wherein integrating into the VCR each one of said plurality of content repositories includes:
providing for mapping of requests on the VCR to one of said plurality of repositories.

11. A method for integrating a plurality of content repositories into a virtual content repository (VCR), comprising:
providing credential information to each one of said plurality of content repositories;
receiving authorization information from each one of said plurality of content repositories;
authorizing each one of said plurality of content repositories;
incorporating each one of said plurality of content repositories into a hierarchical namespace;
extending a content model to include content from each one of said plurality of content repositories;
wherein each one of said plurality of content repositories exposes a first set of services to enable its integration into the VCR; and
wherein the VCR is a logical representation of the plurality of content repositories such that the plurality of content repositories behave as a single content repository.

12. The method of claim 11 wherein:
the credential information includes a username and a password.

13. The method of claim 11 wherein:
the credential information is based on Java Authentication and Authorization Service (JAAS).

14. The method of claim 11 wherein:
the first set of services accepts the credential information.

15. The method of claim 11 wherein:
the first set of services provides the authorization information.

16. The method of claim 11 wherein:
each one of said plurality of content repositories exposes a second set of services that is related to implementing the content model.

17. The method of claim 11, further comprising:
providing for mapping of requests on the VCR to one of the plurality of repositories.

18. The method of claim 11 wherein incorporating each one of said plurality of content repositories into the hierarchical namespace comprises:
providing for content in each of said plurality of content repositories;
1) a first identifier that uniquely identifies the content within one of said plurality of content repositories; and
2) a second identifier that uniquely identifies the content within the namespace.

19. The method of claim 18, further comprising:
providing for mapping of requests on content to one of said plurality of repositories; and
wherein the mapping is based on at least one of: 1) the first identifier associated with the content; and 2) the second identifier associated with the content.

20. A system comprising:
means for providing credential information to each one of said plurality of content repositories;
means for receiving authorization information from each one of said plurality of content repositories;
means for authorizing each one of a plurality of content repositories;
means for incorporating each one of said plurality of content repositories into a hierarchical namespace;
means for extending a content model to include content from each one of said plurality of content repositories;
wherein each one of said plurality of content repositories exposes a first set of services to enable its integration into the VCR.

21. The method of claim 20 wherein:
the credential information includes a username and a password.

22. The method of claim 20 wherein:
the credential information is based on Java Authentication and Authorization Service (JAAS).

23. The method of claim 20 wherein:
the first set of services accepts the credential information.

24. The method of claim 20 wherein:
the first set of services provides the authorization information.

25. The system of claim 20 wherein:
each one of said plurality of content repositories exposes a second set of services that is related to implementing the content model.

26. The system of claim 20, further comprising:
means for providing mapping of requests on the VCR to one of the plurality of repositories.

27. The system of claim 20 wherein incorporating each one of said plurality of content repositories into the hierarchical namespace comprises:
means for providing for content in each of said plurality of content repositories;
1) a first identifier that uniquely identifies the content within one of said plurality of content repositories; and
2) a second identifier that uniquely identifies the content within the namespace.

28. The system of claim 27, further comprising:
providing for mapping of requests on content to one of said plurality of repositories; and
wherein the mapping is based on at least one of: 1) the first identifier associated with the content; and 2) the second identifier associated with the content.

29. A machine readable medium having instructions stored thereon that when executed by a processor cause a system to:
providing credential information to each one of said plurality of content repositories;
receiving authorization information from each one of said plurality of content repositories;
authorizing each one of a plurality of content repositories;
incorporating each one of said plurality of content repositories into a hierarchical namespace;
extending a content model to include content from each one of said plurality of content repositories;

wherein each one of said plurality of content repositories exposes a first set of services to enable its integration into the VCR; and wherein the VCR is a logical representation of the plurality of content repositories such that the plurality of content repositories behave as a single content repository.

30. The machine readable medium of claim 29 wherein: the credential information includes a username and a password.

31. The machine readable medium of claim 29 wherein: the credential information is based on Java Authentication and Authorization Service (JAAS).

32. The machine readable medium of claim 29 wherein: the first set of services accepts the credential information.

33. The machine readable medium of claim 29 wherein: the first set of services provides the authorization information.

34. The machine readable medium of claim 29 wherein: each one of said plurality of content repositories exposes a second set of services that is related to implementing the content model.

35. The machine readable medium of claim 29, further comprising instructions that when executed cause the system to:
provide for mapping of requests on the VCR to one of the plurality of repositories.

36. The machine readable medium of claim 29, further comprising instructions that when executed cause the system to:
provide for content in each of said plurality of content repositories;
1) a first identifier that uniquely identifies the content within one of said plurality of content repositories; and
2) a second identifier that uniquely identifies the content within the namespace.

37. The machine readable medium of claim 36, further comprising instructions that when executed cause the system to:
provide for mapping of requests on content to one of said plurality of repositories; and
wherein the mapping is based on at least one of: 1) the first identifier associated with the content; and 2) the second identifier associated with the content.

38. A computer data signal embodied in a transmission medium comprising:
a code segment including instructions to provide credential information to each one of said plurality of content repositories;
receiving authorization information from each one of said plurality of content repositories;
a code segment including instructions to authorize each one of said plurality of content repositories;
a code segment including instructions to incorporate each one of said plurality of content repositories into a hierarchical namespace;
a code segment including instructions to extend a content model to include content from each one of said plurality of content repositories;
wherein each one of said plurality of content repositories exposes a first set of services to enable its integration into a virtual content repository (VCR); and
wherein the VCR is a logical representation of the plurality of content repositories such that the plurality of content repositories behave as a single content repository.

39. The computer data signal of claim 38 wherein: the credential information includes a username and a password.

40. The computer data signal of claim 38 wherein: the credential information is based on Java Authentication and Authorization Service (JAAS).

41. The computer data signal of claim 38 wherein: the first set of services accepts the credential information.

42. The computer data signal of claim 38 wherein: the first set of services provides the authorization information.

43. The computer data signal of claim 38 wherein: each one of said plurality of content repositories exposes a second set of services that is related to implementing the content model.

44. The computer data signal of claim 38, further comprising:
a code segment including instructions to provide for mapping of requests on the VCR to one of the plurality of repositories.

45. The computer data signal of claim 38, further comprising:
a code segment including instructions to provide for content in each of said plurality of content repositories;
1) a first identifier that uniquely identifies the content within one of said plurality of content repositories; and
2) a second identifier that uniquely identifies the content within the namespace.

46. The computer data signal of claim 45, further comprising:
a code segment including instructions to provide for mapping of requests on content to one of said plurality of repositories; and
wherein the mapping is based on at least one of: 1) the first identifier associated with the content; and 2) the second identifier associated with the content.

* * * * *

UNITED STATES PATENT AND TRADEMARK OFFICE
CERTIFICATE OF CORRECTION

| | | |
|---|---|---|
| PATENT NO. | : 7,293,286 B2 | Page 1 of 1 |
| APPLICATION NO. | : 10/618513 | |
| DATED | : November 6, 2007 | |
| INVENTOR(S) | : Owen et al. | |

It is certified that error appears in the above-identified patent and that said Letters Patent is hereby corrected as shown below:

In column 1, line 28, delete "MODEL." and insert -- MODEL, --, therefor.

In column 3, line 16, delete "extensible" and insert -- eXtensible --, therefor.

In column 7, line 17, delete "NodeOp" and insert -- NodeOps --, therefor.

In column 8, line 14, delete "Retreive" and insert -- Retrieve --, therefor.

In column 8, line 15, delete "Retreive" and insert -- Retrieve --, therefor.

In column 11, line 63, delete "repositories;" and insert -- repositories: --, therefor.

In column 12, line 44, delete "repositories;" and insert -- repositories: --, therefor.

In column 13, line 32, delete "repositories;" and insert -- repositories: --, therefor.

In column 14, line 38, delete "repositories;" and insert -- repositories: --, therefor.

Signed and Sealed this

Sixteenth Day of March, 2010

David J. Kappos
*Director of the United States Patent and Trademark Office*